United States Patent Office 3,217,467
Patented Nov. 16, 1965

3,217,467
PROCESS FOR THE RECOVERY OF ACETYLENE AND SOLUTION OF ACETYLENE IN 2-METHYL-4-PYRONE
Robert J. Evans, Texas City, Tex., assignor to Monsanto Company, a corporation of Delaware
No Drawing. Filed May 22, 1961, Ser. No. 111,441
2 Claims. (Cl. 55—64)

This invention relates to a novel acetylene solution, a new solvent composition, and more specifically to the use of said solvent in an acetylene purification process. This invention also relates to the recovery of acetylene from an acetylene containing gas by means of a selective solvent.

It is known in the art that various organic compounds have shown utility as selective solvents for acetylene, thereby affording means of extracting acetylene from gas mixtures or increasing the acetylene content of gas mixtures in a process for the purification of acetylene. These compounds also have utility as selective solvents for storing acetylene in the form of solutions.

It is the object of this invention to provide a novel acetylene solvent having exceptional utility for extracting acetylene from a gas mixture or for storing acetylene in the form of solutions. Other objects will become apparent from the description of the invention.

It has been discovered that the compound 2-methyl-4-pyrone having the structural formula

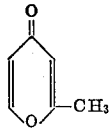

is an excellent solvent for acetylene. The Bunsen coefficient (volume of gas, measured at 0° C. and 760 mm. mercury, dissolved at the temperature of the experiment, in one volume of solvent at a gas partial pressure of 760 mm. of mercury) for acetylene in this solvent indicates its excellent solvent action for acetylene. The Bunsen coefficient of 2-methyl-4-pyrone measured in this case at 24° C. was 11.6. As a comparison the Bunsen coefficient for butyrolactone, one of the outstanding acetylene solvents, is 11.8 at 25° C.

According to this invention a new compound 2-methyl-4-pyrone has been discovered which can be used efficiently in the extraction of acetylene from a dilute acetylene gas stream such as is obtained by the partial oxidation of methane to produce an acetylene bearing gas.

In addition to the utility of this solvent in the extraction of acetylene from an acetylene-bearing gas stream, the Bunsen coefficient clearly indicates that it is particularly suited for storing acetylene under elevated pressures. The 2-methyl-4-pyrone may be used as is for an acetylene solvent or may be used in mixtures with other acetylene solvents.

The following example illustrates the preparation of this compound, it being understood that this example is merely illustrative and not limitative of the invention.

*Example I*

In ordinary laboratory glass equipment at atmospheric pressure, 30 grams of propargaldehyde (HC≡C—CHO) was dissolved in benzene and added to an excess of methyl acetylene magnesium bromide (CH₃—C≡C—MgBr) in benzene. A small amount of ether and HCl were added to the solution after which it was stirred at room temperature for a period of 4 hours. The benzene was evaporated and the product distilled to obtain a 60% yield of 1,4-hexadiyne-3-ol

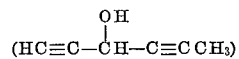

This product was dissolved in a benzene solution and added to an aqueous solution of sulfuric acid and chromic acid. After vigorous stirring at room temperature, the benzene layer was evaporated and the product distilled which resulted in an 80% yield of 1,4-hexadiyne-3-one

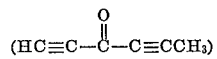

Twenty grams of this compound was dissolved in 250 ml. of a 20% aqueous solution of methanol. Twenty-six grams of Dowex 50W-X4, an anion exchange resin, was added with sulfuric acid and mercuric sulphate in a water solution. This mixture was refluxed for approximately 4 hours at 65° C. The methanol and water were evaporated and the product distilled to obtain a 20% yield of 2-methyl-4-pyrone. The boiling point of the final product was found to be 100° C. at 10 mm. of mercury pressure. The index of refraction determined at 23° C. was 1.5262. The density at 31.6° C. was found to be 1.1485. The analysis was calculated to be 65.44% C and 5.49% H. It was determined experimentally that 65.54% was C and 5.60% was H.

The following example shows the usefulness of the compound, 2-methyl-4-pyrone, as a selective acetylene solvent. However, it should not be construed as so limiting the invention.

*Example II*

Dilute acetylene, obtained from the partial oxidation of methane with oxygen, and having the following composition: acetylene, 8.5 mol percent, hydrogen, 51.4 mol percent, nitrogen, 1.6 mol percent, carbon monoxide, 26.3 mol percent, methane, 5.8 mol percent, carbon dioxide, 5.9 mol percent, and all other components, 0.5 mol percent is recovered from the acetylene converter effluent. This gas stream is treated under pressure with the 2-methyl-4-pyrone solvent by counter-current absorption in a packed column (or in any other convenient manner well known to those skilled in the art). The solution of acetylene is then transferred to a suitable desorption column where the pressure is released and the temperature raised. Concentrated acetylene is thus obtained and any contamination of acetylene with the solvent is so small as to be insignificant.

This pyrone reacts with ammonia and alkyl amines to form the corresponding pyridones. These and other derivatives appear to have value as hypnotic and anti-bacterial agents.

What is claimed is:
1. A composition of matter consisting essentially of a solution of acetylene in 2-methyl-4-pyrone.
2. In a process for the recovery of acetylene from an acetylene containing gas, the step of treating said gas with 2-methyl-4-pyrone to form a solution of said acetylene in said 2-methyl-4-pyrone.

References Cited by the Examiner

UNITED STATES PATENTS

| | | | |
|---|---|---|---|
| 2,383,547 | 8/1945 | Hamill et al. | 252—1 |
| 2,657,219 | 10/1953 | Isler et al. | 260—345.9 |
| 2,687,418 | 8/1954 | Sommer | 260—345 |
| 2,715,101 | 8/1955 | Nelson | 252—1 |
| 2,715,102 | 8/1955 | Nelson | 252—1 |
| 2,794,516 | 6/1957 | Baggett | 55—64 |
| 2,799,365 | 7/1957 | Reetz | 55—64 |

OTHER REFERENCES

Chemical Abstracts, volume 37, pages 2642 (1943).

Sina et al.: Chemical Society Journal, London, part IV, pages 3344–5 (1950).

JULIUS GREENWALD, *Primary Examiner.*

IRVING MARCUS, *Examiner.*